United States Patent
Venkatraman et al.

(10) Patent No.: US 12,081,047 B2
(45) Date of Patent: Sep. 3, 2024

(54) POWER SYSTEM WITH BATTERY CHARGING CONTROL

(71) Applicant: Apple Inc., Cupertino, CA (US)

(72) Inventors: Kartik R. Venkatraman, Santa Clara, CA (US); Santhanakrishnan Geeyarpuramnadathur, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 567 days.

(21) Appl. No.: 16/054,360

(22) Filed: Aug. 3, 2018

(65) Prior Publication Data

US 2019/0305597 A1 Oct. 3, 2019

Related U.S. Application Data

(60) Provisional application No. 62/652,230, filed on Apr. 3, 2018.

(51) Int. Cl.
| | |
|---|---|
| *H02J 7/00* | (2006.01) |
| *H02J 7/24* | (2006.01) |
| *H02J 50/10* | (2016.01) |
| *H02J 50/12* | (2016.01) |
| *H02J 50/80* | (2016.01) |
| *H04W 4/02* | (2018.01) |

(52) U.S. Cl.
CPC ............ *H02J 7/00034* (2020.01); *H02J 7/24* (2013.01); *H02J 50/10* (2016.02); *H02J 50/12* (2016.02); *H02J 50/80* (2016.02); *H04W 4/02* (2013.01)

(58) Field of Classification Search
CPC .. H02J 50/12; H02J 50/80; H02J 7/242; H02J 7/24; H02J 7/00034; H02J 50/10; H04W 4/02
USPC .......................................................... 320/137
See application file for complete search history.

(56) References Cited

U.S. PATENT DOCUMENTS

| | | | |
|---|---|---|---|
| 8,922,329 B2 | 12/2014 | Davis et al. | |
| 9,910,101 B2 | 3/2018 | Lee et al. | |
| 9,912,189 B2 | 3/2018 | Causey et al. | |
| 9,935,501 B2 * | 4/2018 | Cho ........................ | H02J 50/12 |

(Continued)

FOREIGN PATENT DOCUMENTS

| | | |
|---|---|---|
| CN | 1811481 A | 8/2006 |
| CN | 104539303 A | 4/2015 |

(Continued)

*Primary Examiner* — Nathaniel R Pelton
(74) *Attorney, Agent, or Firm* — Treyz Law Group, P.C.; Tianyi He

(57) ABSTRACT

A power system uses a power transmitting device to charge batteries in power receiving devices. Wireless power is transmitted using coils in the power transmitting device and coils in the power receiving devices. Usage history information such as power consumption, times and dates of device usage, battery charge state information, device location information, and other information is gathered using portable electronic devices in the system. Control circuitry in the power transmitting device or elsewhere in the system controls power transfer so that battery charging is performed in accordance with appropriate battery charging settings. Battery charging settings such as maximum charge level, charge rate, charging start and stop times, and other settings are adjusted based on usage history information from one or more devices and/or one or more users.

18 Claims, 5 Drawing Sheets

(56) References Cited

U.S. PATENT DOCUMENTS

| | | | |
|---|---|---|---|
| 2011/0279078 A1* | 11/2011 | Hara | H02J 7/02 |
| | | | 320/107 |
| 2014/0191724 A1 | 7/2014 | Wojcik et al. | |
| 2015/0066231 A1* | 3/2015 | Clifton | H02J 3/382 |
| | | | 700/296 |
| 2015/0293580 A1* | 10/2015 | Munoz | G16H 20/30 |
| | | | 713/323 |
| 2016/0012445 A1* | 1/2016 | Villa-Real | G06Q 20/353 |
| | | | 705/44 |
| 2016/0141893 A1* | 5/2016 | Lee | G06F 1/26 |
| | | | 320/107 |
| 2016/0226299 A1* | 8/2016 | Nam | H02J 7/0042 |
| 2017/0040815 A1* | 2/2017 | Todasco | H02J 7/0027 |
| 2017/0168555 A1* | 6/2017 | Munoz | G06F 1/3228 |
| 2017/0217319 A1* | 8/2017 | Araki | G01B 21/16 |
| 2017/0338684 A1* | 11/2017 | Mishriki | H04B 5/0037 |
| 2017/0373522 A1 | 12/2017 | Pelosi et al. | |
| 2018/0351387 A1* | 12/2018 | Gupta | H02J 50/10 |

FOREIGN PATENT DOCUMENTS

| | | | |
|---|---|---|---|
| CN | 104813532 A | 7/2015 | |
| CN | 105429191 A | 3/2016 | |
| CN | 105576838 A | 5/2016 | |
| CN | 106981932 A | 7/2017 | |
| CN | 209562213 U | 10/2019 | |
| KR | 20160057091 A | 5/2016 | |
| KR | 20170016956 A | 2/2017 | |
| KR | 101738187 B1 | 5/2017 | |
| KR | 20170083099 A | 7/2017 | |

\* cited by examiner

POWER SYSTEM WITH BATTERY CHARGING CONTROL

This application claims the benefit of provisional patent application No. 62/652,230, filed Apr. 3, 2018, which is hereby incorporated by reference herein in its entirety.

FIELD

This relates generally to power systems, and, more particularly, to power systems for charging electronic device batteries.

BACKGROUND

Portable electronic devices such as cellular telephones, wristwatch devices, tablet computers, wireless earbuds, and other portable equipment operate under battery power. To ensure battery run time, users often charge their devices fully whenever possible. Some users may even leave a device connected to a charger for a prolonged period of time, even when the device is not likely to be used in the near future.

A battery ages as it is charged and discharged repeatedly. A battery also ages as it is held at a high state of charge for extended periods of time. To mitigate aging, a battery may be charged less aggressively and the device may be powered down after charging. But, such a charging profile sometimes produces a battery charge level that is insufficient to meet a user's expectations.

SUMMARY

A power system uses a power transmitting device to charge batteries in power receiving devices. In some configurations, wireless power is transmitted. Wireless power is transmitted using coils in a wireless power transmitting device. Coils in wireless power receiving devices are used in receiving the wireless power to charge the batteries of the wireless power receiving devices.

Usage history information such as power consumption, times and dates of device usage, battery charge state information, a device's proximity to other devices owned by the same user may gathered (with the user's permission) using portable electronic devices in the system. As discussed further below, the system can support "opt in" and "opt out" options so that a user can select whether or not to allow usage history information to be used to enhance battery charging. Usage history information can also be encrypted using a user-defined password or other encryption key so that users can maintain desired amounts of privacy over their usage history information. Control circuitry in the system controls power transfer so that battery charging is performed in accordance with appropriate battery charging settings. Battery charging settings such as maximum charge level, charge rate, charging start and stop times, and other settings are adjusted based on usage history information from one or more devices.

DETAILED DESCRIPTION

Figure 1:
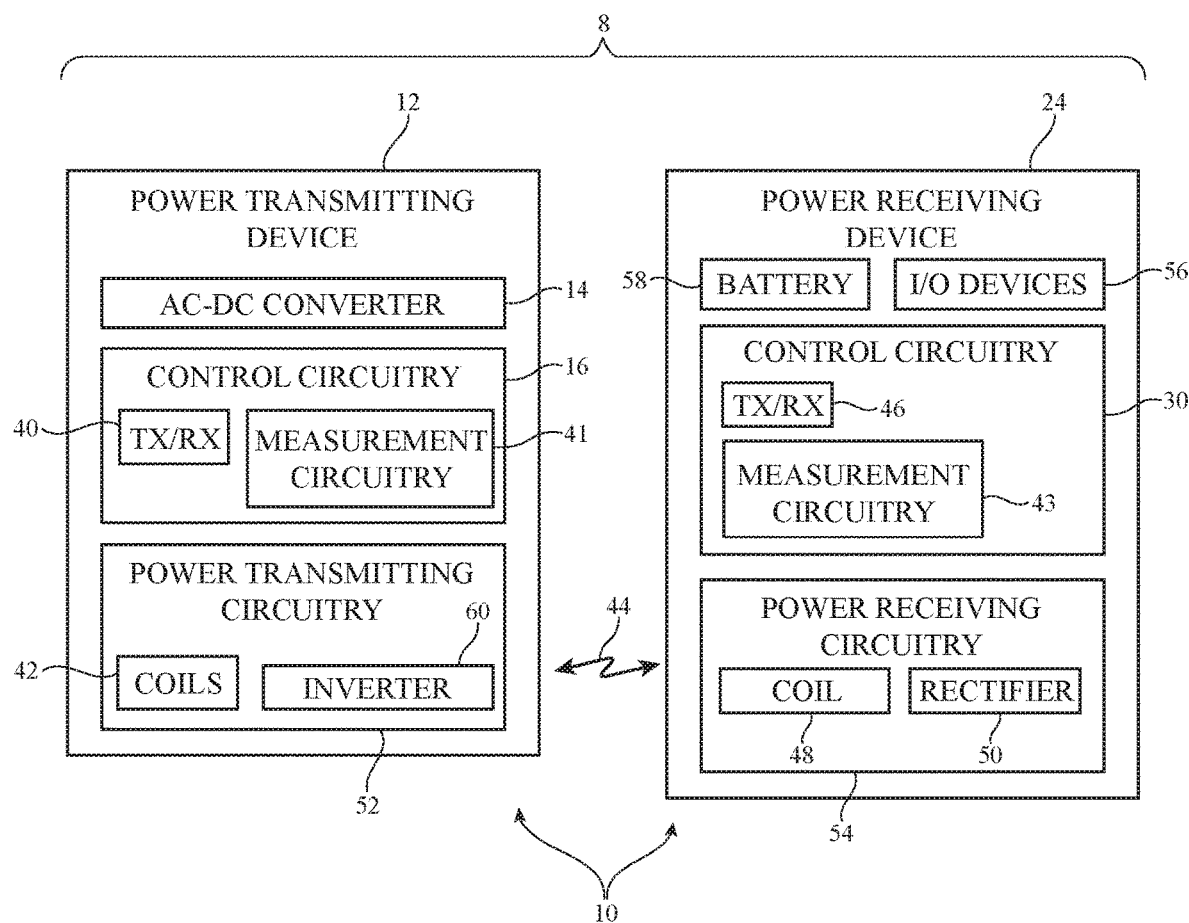
FIG. 1 is a schematic diagram of an illustrative charging system in accordance with an embodiment.

Portable electronic devices have batteries. Wired and wireless charging systems may be used in charging the batteries. For example, a user may place devices such as wristwatch devices and cellular telephones on a wireless charging mat to wirelessly charge these devices. In some scenarios, devices are charged by plugging the devices into a charging system with a cable.

To promote user experience, it is desirable to charge the battery in a user's device so that the battery is charged when the user desires to use the device and so that the amount of charge on the battery is sufficient for the user's intended use of the device. A charging system can ensure that the user's expectations are automatically met using device usage history information for one or more devices. At the same time, the charging system can make charging adjustments that help preserve battery health.

As described in additional detail below, the charging system can utilize device usage history information in accordance with user privacy settings. For example, the system may allow users to "opt in" or "opt out" of usage history information and/or may allow users to establish encryption keys (e.g., passwords) for encrypting usage history information. In some embodiments, information exchange to facilitate charging occurs between devices that are associated with the same user account. In some embodiments, users may also set desired privacy levels for usage history information by informing the charging system of desired levels of privacy without explicitly choosing a usage history password.

In some situations, device usage history information can be used to help adjust battery charging operations in a charging system. For example, if a user only uses a wristwatch device during weekdays starting at 9:00 AM and only uses the wristwatch device for three hours before returning the wristwatch device to the charging system to top off the battery, a charging system may automatically adjust the charging of the battery in the wristwatch to ensure adequate battery charge for three hours of use by 9:00 AM each weekday morning. The charging system may, as an example, provide the battery in the wristwatch of this user with less charge than a comparable battery in the wristwatch of a user that uses the wristwatch for no less than twelve hours each day. By charging the user's battery to less than the full capacity of the battery while still meeting all of the user's expectations, the charging system may help reduce wear on the user's battery due to excessive battery charge cycling.

Users can selectively block use of, or access to, information such as usage history data (e.g., using password protection, user selected privacy level settings, opt-in and/or opt-out policies, etc.). A system incorporating some or all of the technologies described herein can include hardware and/or software that prevents or blocks access to such usage history data. For example, the system can allow users to "opt in" or "opt out" of participation in the collection of usage history data or portions thereof. Also, users can select not to provide specific information, or permit provision of some types of data (e.g., locations of use) but not other types of usage history data.

If a user does not maintain a strict schedule, it can be challenging to predict the time at which charging should be complete and the appropriate level to which the battery should be charged. To enhance prediction accuracy and thereby provide a satisfactory user experience while helping to maintain good battery health, additional information is taken into account in adjusting charging settings. The additional information is obtained by gathering usage information for one or more additional devices used by the user and/or devices used by family members and others. If desired, family members may be provided with opportunities to adjust privacy settings so that usage history information is encrypted, restricted based on opt-in and/or opt-out policies, and/or is otherwise maintained private in accordance with the wishes of the family members.

An illustrative charging system of the type that may be used in charging batteries based on usage information is shown in FIG. 1. Charging system 8 (sometimes referred to as a power system) includes electronic devices 10. Electronic devices 10 include electronic devices that provide power (e.g., charging mats, wired power adapters, tablet computers and other portable electronic devices with wireless power transmitting capabilities, etc.). Electronic devices 10 also include electronic devices that receive power. These power receiving devices may include, for example, portable electronic devices such as cellular telephones and wristwatch devices (as examples). In some arrangements of system 8, devices 10 include servers (e.g., networks of one or more computers accessible through the internet or other network) or other remote computing equipment (e.g., equipment associated with cloud data services). Devices such as these may be powered using mains power or other power sources.

Power can be used for powering circuitry in a power receiving device other than a battery and can be used for charging a battery in a power receiving device. Because battery charging is a common use of received power, wireless power transfer operations in system 8 are sometimes referred to as battery charging operations. Power can also be provided to a receiving device to operate a display or other circuitry in the receiving device without battery charging, if desired.

Charging can be performed by transferring power from a power transmitting device such as device 12 and a power receiving device such as device 24. Power may be transferred (transmitted) between device 12 and device 24 over a wired connection (e.g., a cable) or may be transferred wirelessly. In the example of FIG. 1, power is being transferred wirelessly using wireless power signals 44.

During operation of system 8, wireless power transmitting device 12 wirelessly transmits power to one or more wireless power receiving devices such as device 24. The wireless power receiving devices may include electronic devices such as wristwatches, cellular telephones, tablet computers, laptop computers, ear buds, battery cases for ear buds and other devices, tablet computer pencils and other input-output devices (e.g., accessory devices), wearable devices, or other electronic equipment. The wireless power transmitting device may be an electronic device such as a wireless charging mat, a tablet computer or other portable electronic device with wireless power transmitting circuitry (e.g., one of devices 24 that has wireless power transmitting circuitry), or other wireless power transmitting device. The wireless power receiving devices use power from the wireless power transmitting device for powering internal components and for charging internal batteries.

As shown in FIG. 1, wireless power transmitting device 12 includes control circuitry 16. Wireless power receiving device 24 includes control circuitry 30. Control circuitry in system 8 such as control circuitry 16 and control circuitry 30 (and/or control circuitry in other devices 10) is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, starting and stopping charging operations, turning devices 10 on and off, placing devices 10 in low-power sleep modes, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of devices 10 (e.g., control circuitry 16 and/or 30). The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable electronic device (cellular telephone, tablet computer, laptop computer, etc.), may be equipment that has been incorporated into furniture, a vehicle, or other system, or may be other wireless power transfer equipment. Illustrative configurations in which wireless power transmitting device 12 is a wireless charging mat or portable electronic device are sometimes described herein as an example.

Power receiving device 24 may be a portable electronic device such as a wristwatch, a cellular telephone, a laptop computer, a tablet computer, an accessory such as an earbud, a tablet computer input device such as a wireless tablet computer pencil, a battery case, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. In some configurations, AC-DC power converter 14 may be provided in an enclosure (e.g., a power brick enclosure) that is separate from the enclosure of device 12 (e.g., a wireless charging mat enclosure or portable electronic device enclosure) and a cable may be used to couple DC power from the power converter to device 12. DC power may be used to power control circuitry 16.

During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat) or may be arranged in other configurations. In some arrangements, device 12 may have only a single coil. In arrangements in which device 12 has multiple coils, the coils may be arranged in multiple layers (e.g., three layers or any other suitable number of layers) and each of the multiple layers may have coils that overlap coils in other layers.

As the AC currents pass through one or more coils 42, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering (charging) an energy storage device such as battery 58 and can be used in powering other components in device 24. For example, device 24 may include input-output devices 56 such as a display, touch sensor, communications circuits, audio components, sensors, components that produce electromagnetic signals that are sensed by a touch sensor in tablet computer or other device with a touch sensor (e.g., to provide pencil input, etc.), and other components and these components may be powered by the DC voltages produced by rectifier 50 (and/or DC voltages produced by battery 58 or other energy storage device in device 24).

Device 12 and/or device 24 may communicate wirelessly (e.g., using in-band and out-of-band communications). Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In some configurations, devices 10 can communicate through local area networks and/or wide area networks (e.g., the internet). Device 12 and device 24 may be associated with the same user account. Further, if permitted by the user, a cellular telephone or other device 10 may transmit information to a computer (e.g., one of devices 10) that is associated with an online service provider (e.g., a cloud service that facilitates communications between devices 10). As an example, the cellular telephone may wirelessly connect to a service provider through a wireless local area network and modem coupled to the internet. Other devices 10 (e.g., wireless transmitting devices and/or wireless receiving devices) may request, again as permitted by the user in accordance with privacy settings, opt-in and/or opt-out policies, user-defined and/or system-defined encryption keys, and/or other permissions satisfactory to the user, some or all of the information from the service provider. In this way, devices 10 can share information such as usage information (sometimes referred to as usage history information) across local and wide area networks as the user deems appropriate to facilitate charging operations.

Wireless transceiver circuitry 40 can use one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of communications (e.g., other types of in-band communications) may be used, if desired.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48. Other types of in-band communications between device 12 and device 24 may be used, if desired.

In-band communications between device 24 and device 12 uses ASK modulation and demodulation techniques or other suitable in-band communications techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows a stream of ASK data bits (e.g., a series of ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 42 to determine whether any devices 24 are present on device 12 (e.g., whether devices 24 are suspected to be present on device 12). Measurement circuitry 43 in control circuitry 30 and/or in control circuitry 16 may also be used in making current and voltage measurements, and/or may be used in making other measurements on wireless power receiving circuitry 54.

Battery charging parameters in system 8 can be adjusted based on usage history information and other information (e.g. usage history information obtained by system 8 in accordance with user settings such as privacy settings, encryption key information, opt-in and/or opt-out policies, etc.). System 8 (e.g., device 12 and/or device 24) may, for example, adjust charging parameters such as battery charging start time, battery charging rate, battery charging duration, battery charging stop time, a battery charge level at which battery charging is halted (sometimes referred to as a maximum charge level), and/or other charging parameters. In some configurations, system 8 can adjust the amount of power drawn by device 24 during charging and/or once charging is complete. For example, device 12 and/or device 24 can place device 24 in a normal low power sleep state or deep low power sleep state or can turn off device 24 upon charging battery 58 to a desired level. Optimized power usage (when appropriate and allowed by user expectations) can prolong battery life.

Figure 2:
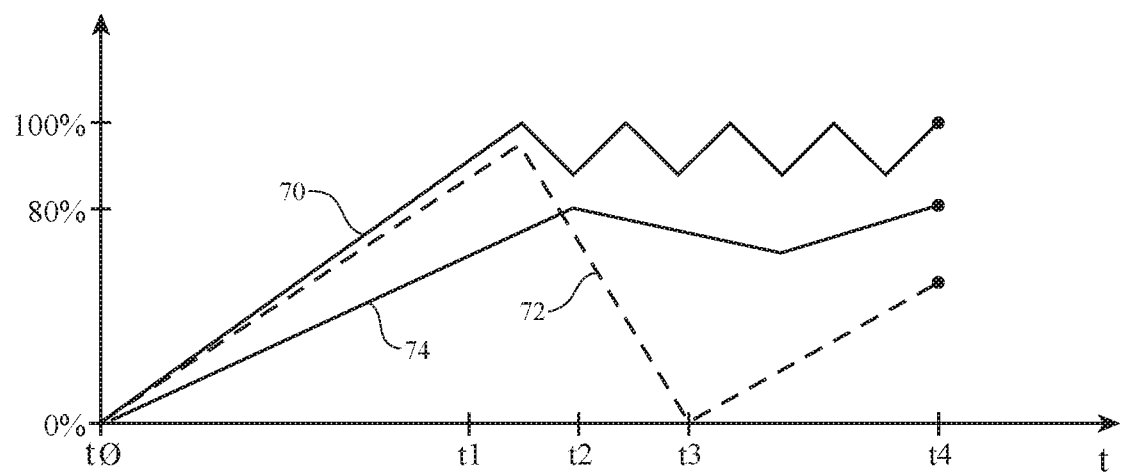
FIG. 2 is a graph showing how the state of charge of a battery may vary as a function of time under different charging schemes in accordance with an embodiment.

Battery health is affected by battery charging temperature, battery charging rate, and other factors (e.g., the amount of charge/discharge cycling in a battery charging session). By adjusting battery charging settings, system 8 helps to maintain battery health while providing a satisfactory user experience. Battery charging operations with different illustrative battery charging parameters are shown in the graph of FIG. 2, in which battery state of charge (battery charge level) has been plotted as a function of time for three different charging scenarios. Curves 70, 72, and 74 of FIG. 2 correspond respectively to battery charging using three different sets of battery charging settings. State of charge for a battery (e.g., battery charge level relative to a maximum battery capacity) can be determined by battery voltage (e.g., using battery voltage level as a proxy for the state of charge on the battery, using coulomb counting, or using other techniques for determining battery state of charge).

In a first charging scenario (curve 70), battery 58 is charged at a relatively rapid rate starting at time t0. In this scenario, battery 58 is fully charged at time t1. When the battery is fully charged, charging is temporarily halted. The charge level on battery 58 then drops as power is dissipated in device 24, until a threshold value (e.g., 95% charge level) is reached, causing charging to resume. So long as device 24 is being charged in this way, the battery charge level on battery 58 will sawtooth back and forth, as indicated by the sawtooth shape of curve 70 between time t1 and time t4. At time t4, device 24 is removed from power transmitting device 12 and is used by a user. For example, if device 24 is a wristwatch, the user places the wristwatch on the user's wrist at time t4 and begins using the wristwatch to perform desired functions.

The first charging scenario satisfies the user's expectation for an appropriately charged battery in device 24, but may subject the battery in device 24 to more wear than desired. To reduce sawtooth-induced battery wear, a second charging scenario such as charging scenario of curve 72 may be used. Again, charging begins at time t0 at a relatively rapid rate. To avoid sawtoothing, charging is halted at time t1 and is only resumed when battery 58 has been depleted at time t3. In this second scenario, when charging is halted at time t4 (e.g., as the user removes the wristwatch from device 12), battery 58 will be insufficiently charged and the user's expectation for an appropriately charged battery in device 24 will not be satisfied.

The third charging scenario of FIG. 2 (curve 74) balances the competing interests of maximizing battery health and maximizing the satisfaction of the user's expectations with the charge state of battery 58. In the scenario of curve 74, based on knowledge of the amount of charging time available to system 8 and usage history information indicating that the user does not need a fully charged battery to satisfy the user's daily needs (e.g., knowledge that charging can take place over a relatively long period of time such as time t4-t0 and knowledge that 80% battery charge is sufficient for the user), charging takes place at a slower rate and stops at an 80% charge level (at time t2). In some embodiments, device 24 is placed in a power sleep state when not charging, which reduces the rate at which battery 58 discharges. This approach helps maintain battery health by reducing sawtoothing and produces a battery charge of 80% at time t4, which satisfies this user's expectations.

In order to determine appropriate charging settings to use in system 8, usage information (sometimes referred to as usage history information) can be gathered from devices 10 as permitted by the user (e.g. usage history information can be obtained by system 8 in accordance with user settings such as privacy settings, encryption key information, opt-in and/or opt-out policies, etc.). In some arrangements, information from multiple devices 10 and/or information associated with one or more users is gathered and processed to determine a satisfactory charging scheme. Other information (e.g., information on time, day of week, date, weather, temperature, information on user location separate from device location, and/or other information) can also be used in adjusting charging settings.

Consider, as an example, a scenario in which a user owns two devices 10. The user may, as an example, own both a cellular telephone and a wristwatch device. The cellular telephone and the watch are generally paired (e.g., using Bluetooth® or by registering both the cellular and watch to a user account associated with the user) and used together. If this user happens to leave the watch on a wireless charging mat at home while taking the cellular telephone out of the home, this behavior can be analyzed and a conclusion can be made that the watch is not being used and need not be aggressively charged, as permitted by the user. The watch can therefore be charged at a relatively slow rate and/or smaller maximum charge state (e.g., less than 85% of the battery's capacity or other suitable maximum level) to enhance battery health.

Information on the use of devices 10 can be gathered using one or more of devices 10 when permitted by the devices' user(s). In the present example, information indicating that the watch and cellular telephone are not paired, information that the cellular telephone is moving and/or is located at the user's workplace, and/or other cellular telephone usage information can be used to establish satisfactory charging parameters to use in charging the watch with device 12. Watch usage information such as information on whether the watch is present on device 12, whether the watch is turned on, whether the watch is paired with the cellular telephone, historical information on usage, etc. can also be used. Usage information (e.g. usage history information obtained by system 8 in accordance with user settings such as privacy settings, encryption key information, opt-in and/or opt-out policies, etc.) can be shared in a peer-to-peer fashion (e.g., between the cellular telephone and watch via Bluetooth or near-field communications, WiFi®, or other wireless communications directly between devices), can be shared through device 12 (e.g., by conveying information to device 12 from the cellular telephone and from the watch), can be shared via a cloud service provider (e.g., by sharing usage history information with an on-line device (e.g., a server) that conveys this information, to device 12 and the watch or other wireless power receiving device (e.g., over the internet and/or other wired and/or wireless network paths), and/or may otherwise be shared between devices 10 in system 8.

Users can selectively block use of, or access to, this information. A system incorporating some or all of the technologies described herein can include hardware and/or software that prevents or blocks access to such usage history data. For example, the system can allow users to "opt in" or "opt out" of participation in the collection of usage history data or portions thereof. Also, users can select not to provide specific information, or permit provision of some types of data (e.g., locations of use) but not other types of usage history data. Usage history information can be encrypted, so that only a user's devices and/or other system equipment operated by the user or directly authorized by the user has access to unencrypted versions of the usage history information. User-defined passwords and other privacy settings can be adjusted by a user, if desired.

Entities responsible for the collection, analysis, disclosure, transfer, storage, or other use of such data should comply with established privacy policies and/or practices. Such entities should safeguard and secure access to such data and ensure that others with access to the data also comply. Such entities should implement privacy policies and practices that meet or exceed industry or governmental requirements for maintaining the privacy and security of personal data. For example, an entity should collect users' usage data for legitimate and reasonable uses, and not share or sell the data outside of those legitimate uses. Such collection should occur only after receiving the users' informed consent. Furthermore, third parties can evaluate these entities to certify their adherence to established privacy policies and practices. Encryption may be used where appropriate to maintain user privacy in accordance with user-selected privacy settings, opt-in and/or opt-out policies, etc.

Figure 3:
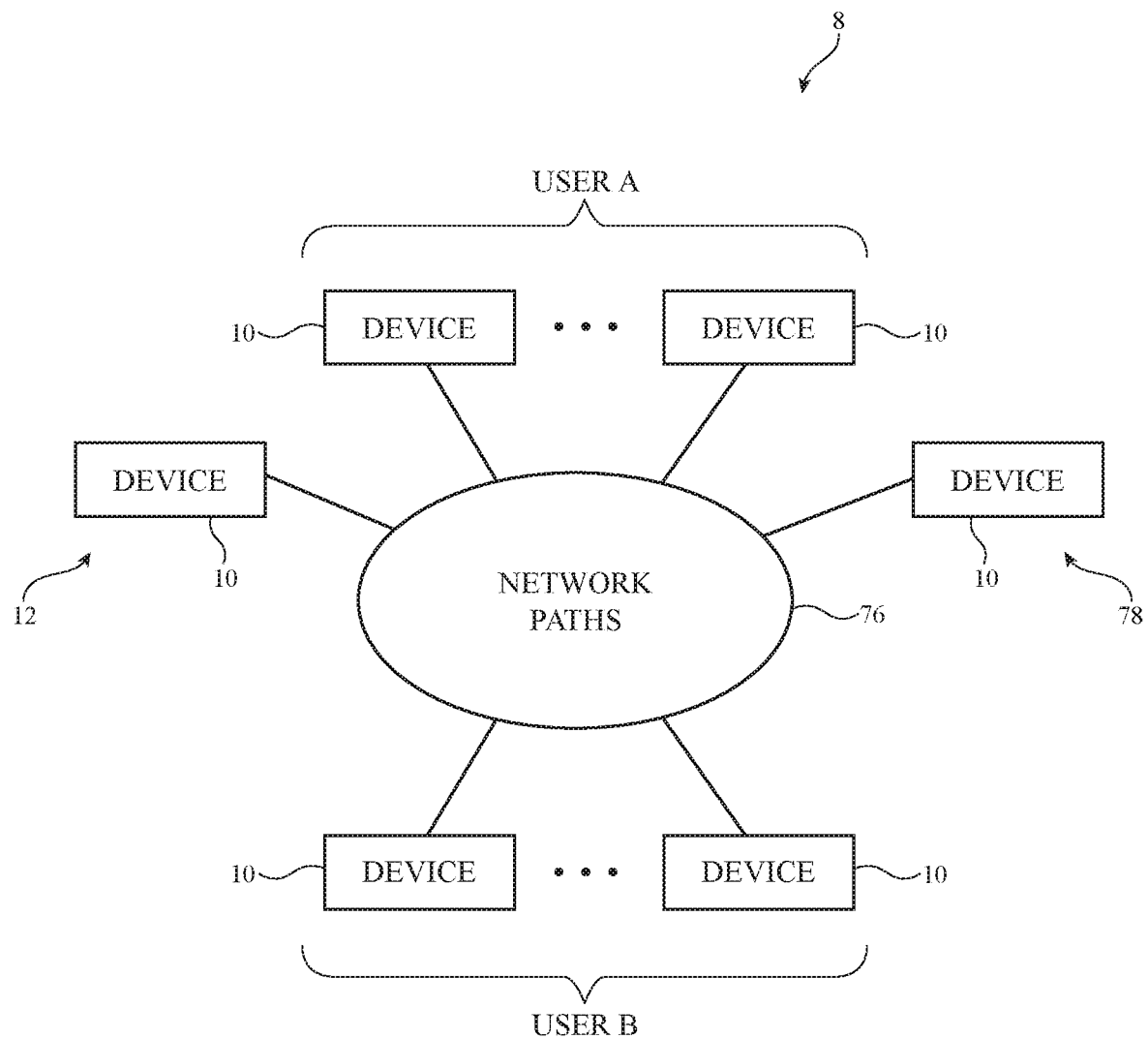
FIG. 3 is a diagram of an illustrative charging system with multiple devices that share information such as device usage information in accordance with an embodiment.

A diagram of system 8 showing how devices 10 may communicate through network paths 76 in system 8 is shown in FIG. 3. Network paths 76 may include wired and/or wireless paths in networks such as local area networks, peer-to-peer networks, and/or wide area networks (e.g., the internet). Bluetooth® communications, wireless local area network communications, near-field communications, in-band and out-of-band communications, cellular telephone communications, and/or other communications may be used in communicating over paths 76.

Devices 10 may include devices that are associated with one or more users (e.g., users A and B). Some devices 10 may be used by multiple users (e.g., multiple family members). Devices 10 may include one or more wireless power transmitting devices 12 and/or wireless power receiving devices 24. One or more of devices 10 (see, e.g., device 78) may including control circuitry (e.g., one or more computers) associated with an online service provider. This device 10 may be used as an intermediary to facilitate sharing of usage history information between devices 10 if permitted by the user(s) as discussed above. Other information sharing (syncing) schemes may be used, if desired. For example, each device 10 that is portable and used by a user away from home may, when brought into proximity of a stationary wireless charging mat or other wireless transmitting device 12, share its associated usage history information with that wireless charging mat (e.g., using wireless in-band communications and/or wireless out-of-band communications). The wireless charging mat may then adjusting charging settings based on the shared usage history information from each of the contributing portable devices. In configuration in which usage history information is shared between users, users can selectively block use of and access to usage history information (e.g., using opt-in and/or opt-out policies, user-defied and/or default encryption keys, user privacy settings, etc.).

Figure 4:
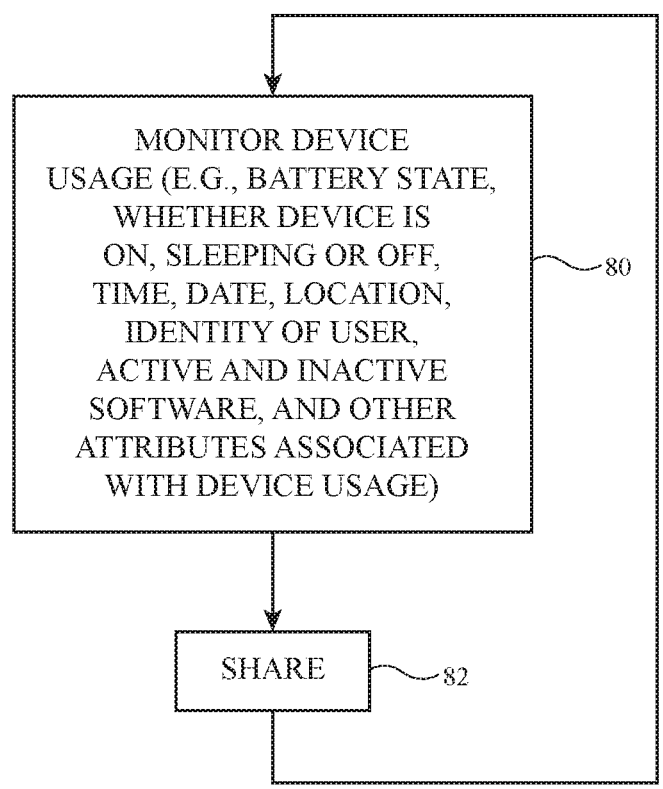
FIG. 4 is a flow chart of illustrative operations involved in gathering and sharing usage information in a charging system in accordance with an embodiment.

FIG. 4 is a flow chart of illustrative operations involved in sharing usage history information in system 8. During the operations of block 8, each device 10 in system 10 may monitor device usage. For example, each device 10 may gather information on battery charge state, whether the device is powered or has been turned off, whether the device has been placed in a low-power normal sleep state or has been placed in a deep extremely low power state, may gather information on the current time and/or date, may gather information on device location (e.g., from satellite navigation system receiver circuitry, from knowledge that the device is communicating with a known wireless local area network access point or is communicating with a known wireless charging mat via in-band or local out-of-band communications), may gather information on the identity of the user of the device (e.g., based on login information, etc.), may gather information on software applications and/or operating system functions and/or other code running on device 10 (e.g., to gauge power consumption and/or user presence/activity), may gather information on other device attributes indicative of usage history (e.g., whether device 10 is paired with other devices, whether device 10 is using heavy amounts of cellular activity, whether device 10 is gathering sensor data, and/or user input commands, etc.). Additional data such as sensor data, information such as weather information and other information available from the internet, and/or other information may also be gathered by devices 10, if desired.

Users can selectively block use of, or access to, this information. A system incorporating some or all of the technologies described herein can include hardware and/or software that prevents or blocks access to such usage history data. For example, the system can allow users to "opt in" or "opt out" of participation in the collection of usage history data or portions thereof. Also, users can select not to provide specific information, or permit provision of some types of data (e.g., locations of use) but not other types of usage history data.

During the operations of block 82, gathered data is shared in whole or in part between devices 10. For example, if a family with two users (user A and user B) both log into and routinely use a shared tablet computer, that tablet computer can share usage information with the devices of both user A and user B and vice versa. This allows system 8 to make charging adjustments based on the usage history of both users. As an example, if usage history indicates that the tablet computer is used by both user A and user B, but is only used at home, device 12 may charge the tablet computer more aggressively than usual in response to determining from the motion of the cellular telephone of either user A or user B that user A or user B will arrive home from work early and is expecting that the tablet computer be fully charged when that user arrives at home.

Figure 5:
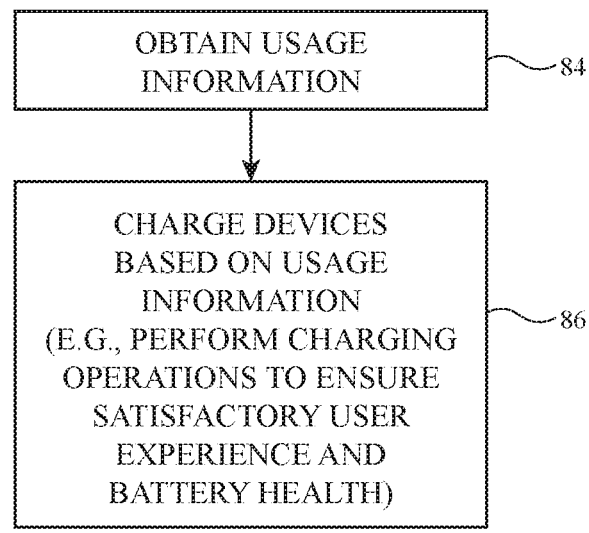
FIG. 5 is a flow chart of illustrative operations involved in charging batteries in devices based on information such as usage history information in accordance with an embodiment.

FIG. 5 is a flow chart of illustrative operations involved in adjusting charging parameters and other parameters (e.g., whether devices 10 are "ON" in a normal (non-sleep) operating state or are in a sleep state) in system 8. During the operations of block 84, devices 10 (e.g., wireless power transmitting device 12 and/or one or more power receiving devices 24) obtain usage history information from one or more devices 10 associated with one or more users, if permitted to do so as discussed above. The usage history information may be obtained (shared/synced among any/all of devices 10) using network paths 76 (FIG. 3).

As permitted by the user, usage history information can be gathered continuously (e.g., whenever devices 10 are in use), can be gathered periodically (e.g., once per hour, once per week, etc.) and/or can be gathered in response to satisfaction of suitable usage history collection criteria (e.g., whenever devices 10 are first turned on, whenever devices 10 change location or charging status, and/or when other events occur). The operations of block 84 may involve gathering usage history information for each of a user's devices, as permitted by the user(s) as discussed above. Device ownership may be associated with attributes such as user credentials (a user assigns a username and password to each of the user's devices, etc.). In some situations, devices are associated with particular users by virtue of pairing (e.g., via Bluetooth® or otherwise) with one of the user's devices. For example, wireless earbuds may be associated with a user by virtue of pairing with the user's cellular telephone.

In some situations, multiple users may establish credentials and logon privileges with a common device. For example, multiple family members may share a laptop computer and each user may have a different username and password. During the operations of block 84, usage history information may be gathered (synced) from each of a user's devices (e.g., by sharing information between any combination of two or more or three or more of a user's devices such as earbuds, cellular telephones, watches, laptop computers, tablet computers, accessories, wireless charging mats and other charging equipment, etc.) and/or usage history information from shared devices and/or devices associated with other users may be gathered for use in adjusting charging settings for any of the user's devices, as permitted by the user(s) as discussed above. As an example, usage history information from the cellular telephone and watch of a family member may be gathered and usage history from a user's cellular telephone, laptop computer, and watch may be gathered. Some or all of this gathered information may then be used in adjusting charging settings for one or more of the user's devices. If desired, for example, charging settings for the user's cellular telephone may be based on the user's cellular telephone usage history, the user's laptop usages history, the usage history of the user's watch, the usage history of the family member's cellular telephone, and/or the usage history of the family member's watch (as an example). During charging, a wireless power transmitting device may, as an example, adjust charging of a device such as a watch of a first user based on usage history information for a portable device such as a cellular telephone of a second user.

During the operations of block 86, devices 10 are charged using charge settings based on the usage history information. For example, charging rates can be adjusted based on knowledge of when devices 10 are typically needed by the user. As an example, a cellular telephone may be needed at 8 AM on weekdays and at 9 AM on weekend days. Based on knowledge of the current day of the week (and time), system 8 can charge the cellular telephone less aggressively on weekends. As another example, the maximum amount of charge placed on battery 58 can vary. It may be observed, for example, that a user's first watch is not used all day when a user's second watch (or a second watch associated with a family member) is placed on a wireless charging mat the previous evening. In response to detecting that the second watch is on the mat, the first watch may be charged to a relatively low charge state and can be placed in a sleep mode or turned off once charged to help enhance battery health.

In yet another illustrative scenario, it may be observed from usage history information that once a watch has been left on a charging mat past 10 AM on a weekday, the watch will not be used until 8 PM. In response to detecting that the watch is on the charging mat at 10 AM, system 8 (e.g., the mat and/or the watch) need not charge the watch battery to a 100% charge state (e.g., battery 58 may be charged to a maximum value of 80% to help preserve battery health).

In some scenarios, usage history information may indicate that battery surplus is available or will be available for a device. Consider, as an example, a scenario in which a user has a wristwatch device. Usage history information may be gathered by the watch and/or a charging mat typically used to charge the watch that indicates the typical battery drain for the watch uses only 50% of the battery's capacity (indicating that there is typically a 50% battery charge surplus for the watch after each use when the battery is charged to full capacity). Usage history information (e.g. usage history information obtained by system 8 in accordance with user settings such as privacy settings, encryption key information, opt-in and/or opt-out policies, etc.) might also include information on the amount of time the user wears the watch on the user's wrist each day (e.g., based on accelerometer data or other motion data gathered by a motion sensor in input/output devices 56, based on information on when the watch is receiving input and/or providing output, based on information on when the watch is turned on/or is wirelessly paired, etc.). If the user wears the watch infrequently, there will typically be a large battery capacity surplus.

Another consideration involves the frequency with which the user engages in high-drain activities (e.g., workout routines in which satellite navigation system circuitry is active and audio streaming features are in use). A user with infrequent high-drain activities will typically have more battery surplus than a user that frequently engages in high-drain activities. However, even if a user does not frequently engage in high-drain activities, the fact that the user engages in such activities occasionally may indicate that there is no typical (predictable) battery surplus.

If desired, typical battery drain can be evaluated based on the typical observed battery drain of a companion device. For example, the battery surplus that might be available for a watch may be influenced by the usage history of a companion device such as cellular telephone that pairs with the watch. If a user typically drains a fairly high amount of battery power on the cellular telephone, system 8 may be conservative in estimating battery surplus (erring on the small side) for the watch, both from the standpoint of ensuring that the watch battery will have excess charge available in the event that the cellular telephone battery becomes depleted and to avoid a scenario in which both devices have low battery capacity (which might not meet user expectations).

Battery surplus projections such as these and other projections based on the shared usage history information obtained at block 84 may be used in system 8 in determining how to charge each of devices 10 that receives power from power receiving device(s) 12 in system 8. As an example, when a device 10 is reliably predicted to always or nearly always have battery surplus of 50%, charging settings can be adjusted to charge the battery of that device to no more than 85% (or other suitable fraction) of the battery's capacity to help maintain battery health. If desired, user input can also be used to adjust battery charge settings (e.g., to adjust preferences for maximum and minimum battery charge levels, etc.).

The operations of block 86 may be performed using control circuitry in a wireless charging mat or other wireless power transmitting device 12, a wireless power receiving device 24, and/or other devices 10. For example, a wireless charging mat may use the usage history information gathered during the operations of block 84 to adjust charging settings for one or more of the user's devices. As another example, one or more of the user's devices may use the usage history information gathered during the operations of block 84 to adjust charging settings (e.g. by serving as a master device that controls an associated slave power transmitting device 12 and/or by adjusting internal power regulator circuitry to control charging).

In addition to adjusting charging based on usage history information (e.g. usage history information obtained by system 8 in accordance with user settings such as privacy settings, encryption key information, opt-in and/or opt-out policies, etc.), charging may be adjusted based on knowledge of which devices 24 are currently receiving power from device 12, the current battery level of each of devices 24, time and date information, information on the geographic location of charging, the geographic locations of one or more of the user's devices and/or other devices such as the devices of family members, the known location of the user (e.g., by virtue of logging into a service associated with a service provider from the user's work computer, indicating that the user is at work), calendar entries on the calendars of the user and/or family members or others, weather information, information from the internet, temperature readings and/or other sensor readings gathered using input-output devices 56 and/or sensors or other circuitry in device 12, and/or other information.

In some situations, remote devices 10 (e.g., a service provider computer) or a controller in a local area network may use its control circuitry in adjusting charging settings (e.g., by controlling or indirectly participating in the control of wireless charging of a device 24 from a device 12). Other control arrangements and/or combinations of these arrangements may be used if desired. In general, power transfer operations can be controlled locally (on one or more devices involved directly in sending/receiving power) and/or may be controlled remotely (e.g., by one or more devices that are not transmitting power or receiving power, but that are in communication with device 12 and/or device(s) 24).

The foregoing is merely illustrative and various modifications can be made to the described embodiments. The foregoing embodiments may be implemented individually or in any combination.

What is claimed is:

1. A power transmitting device configured to charge a battery of a power receiving device, comprising:
   power transmitting circuitry configured to provide power to the power receiving device to charge the battery; and
   control circuitry configured to control the power transmitting circuitry based on usage history information associated with usage of the power receiving device and based on usage history information associated with a portable electronic device other than the power receiving device, wherein the control circuitry is configured to control the power transmitting circuitry to charge the battery to a charge state that is less than a maximum capacity of the battery in response to determining from the usage history information associated with the portable electronic device that the portable electronic device has been taken to a location away from the power receiving device.

2. The power transmitting device of claim 1 wherein the power transmitting circuitry comprises wireless power transmitting circuitry.

3. The power transmitting device of claim 2 wherein the control circuitry is configured to control the power transmitting circuitry in accordance with battery charging settings for the battery of the power receiving device that are determined based on the usage history information associated with the usage of the power receiving device and that are determined based on usage history information indicative of user activity associated with the portable electronic device.

4. The power transmitting device of claim 3 wherein the control circuitry is configured to gather the usage history information associated with the usage of the power receiving device and is configured to gather the usage history information associated with the portable electronic device using an internet.

5. The power transmitting device of claim 3 wherein the power transmitting device includes a power transmitting coil, wherein the control circuitry is configured to gather the usage history information associated with the usage of the power receiving device via in-band communications using the power transmitting coil and is configured to gather the usage history information associated with the portable electronic device via in-band communications using the power transmitting coil.

6. The power transmitting device of claim 3 wherein the battery charging settings include a maximum battery charge level setting for the battery of the power receiving device that is 85% of the maximum capacity or less.

7. The power transmitting device of claim 3 wherein the power receiving device is a watch, wherein the portable electronic device is a cellular telephone, and wherein the watch and the cellular telephone are paired.

8. The power transmitting device of claim 1 wherein the power receiving device is a watch, wherein the portable electronic device is a cellular telephone, and wherein the watch and the cellular telephone are paired.

9. A wireless power transmitting device configured to provide wireless power to charge a battery of a portable electronic device, comprising:
   wireless power transmitting circuitry; and
   control circuitry configured to charge the battery in accordance with a battery charging setting by using the wireless power transmitting circuitry to transmit the wireless power, wherein the battery charging setting is based on device usage history information of multiple portable electronic devices including the portable electronic device, wherein the battery charging setting is a charge rate setting having a charge rate to charge the battery to a reduced charge level less than a full charge level of the battery based on user location information indicative of the portable electronic device not being in use, and wherein the user location information comprises information gathered at an additional one of the multiple portable electronic devices.

10. The wireless power transmitting device of claim 9 wherein the user location information comprises information gathered from satellite navigation system circuitry in the additional one of the multiple portable electronic devices.

11. The wireless power transmitting device of claim 9 wherein the battery charging setting comprises a maximum battery charge level set to the reduced charge level.

12. The wireless power transmitting device of claim 9 wherein the control circuitry is configured to gather the device usage history information on device usage over a wireless communications path.

13. The wireless power transmitting device of claim 9 wherein the control circuitry is configured to communicate with a computer that is separate from the multiple portable electronic devices over a wide area network and is configured to gather the device usage history information on device usage using the computer.

14. The wireless power transmitting device of claim 9 wherein the device usage history information on device usage comprises times and dates of device usage for the multiple portable electronic devices.

15. A battery charging system, comprising:
wireless power transmitting circuitry; and
control circuitry configured to:
  gather first usage history information on usage of a first portable electronic device;
  gather second usage history information on usage of a second portable electronic device;
  gather third usage history information on usage of a third portable electronic device; and
  control charging of a portable electronic device battery for the first portable electronic device with the wireless power transmitting circuitry based at least partly on the first usage history information, the second usage history information, and the third usage history information, wherein the first portable electronic device and the second portable electronic device have a same first device ownership, and wherein the third portable electronic device has a second device ownership different from the first device ownership.

16. The battery charging system of claim 15 wherein the control circuitry is configured to gather the first usage history information from the first portable electronic device using a wireless communications path.

17. The battery charging system of claim 15 wherein the control circuitry is configured to gather the first usage history information and the second usage history information over an in-band wireless communications link using a coil in the wireless power transmitting circuitry.

18. The battery charging system of claim 15 wherein the wireless power transmitting circuitry comprises coils and wherein the first and second portable electronic devices communicate via a wireless communications link.

* * * * *